US012015192B2

(12) United States Patent
Wang et al.

(10) Patent No.: US 12,015,192 B2
(45) Date of Patent: Jun. 18, 2024

(54) TERMINAL DEVICE

(71) Applicant: VIVO MOBILE COMMUNICATION CO.,LTD., Guangdong (CN)

(72) Inventors: Yijin Wang, Guangdong (CN); Xianjing Jian, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 292 days.

(21) Appl. No.: 17/591,153

(22) Filed: Feb. 2, 2022

(65) Prior Publication Data

US 2022/0158330 A1 May 19, 2022

Related U.S. Application Data

(63) Continuation-in-part of application No. PCT/CN2020/098852, filed on Jun. 29, 2020.

(30) Foreign Application Priority Data

Aug. 5, 2019 (CN) ......................... 201910716728.7

(51) Int. Cl.

| | |
|---|---|
| ***H01Q 1/22*** | (2006.01) |
| ***H01Q 1/38*** | (2006.01) |
| ***H01Q 1/42*** | (2006.01) |
| ***H01Q 1/44*** | (2006.01) |
| ***H01Q 9/04*** | (2006.01) |
| ***H01Q 15/14*** | (2006.01) |

(52) U.S. Cl.

CPC ............. *H01Q 1/2283* (2013.01); *H01Q 1/38* (2013.01); *H01Q 1/44* (2013.01); *H01Q 15/14* (2013.01)

(58) Field of Classification Search

CPC .......... H01Q 1/2283; H01Q 1/38; H01Q 1/44; H01Q 15/14; H01Q 5/22; H01Q 25/00; H01Q 9/065; H01Q 21/08; H01Q 1/243; H01Q 1/22; H01Q 1/36; H01Q 1/364; H01Q 1/48; H01Q 1/50; H01Q 19/10

See application file for complete search history.

(56) References Cited

U.S. PATENT DOCUMENTS

| | | | |
|---|---|---|---|
| 2012/0162033 | A1 | 6/2012 | Togashi |
| 2016/0218435 | A1 | 7/2016 | Oh et al. |

(Continued)

FOREIGN PATENT DOCUMENTS

| | | | |
|---|---|---|---|
| CN | 203397335 | U | 1/2014 |
| CN | 104635966 | A | 5/2015 |
| CN | 105094231 | A | 11/2015 |

(Continued)

OTHER PUBLICATIONS

English Translation of CN207704418A (Year: 2018).*

(Continued)

*Primary Examiner* — Daniel D Chang

(74) *Attorney, Agent, or Firm* — IP & T GROUP LLP

(57) ABSTRACT

A terminal device includes: a screen and a mainboard, where an edge of the screen has a clearance area. The terminal device further includes a first RFIC and at least one antenna element. At least a portion of the antenna element is disposed within the clearance area. The antenna element is connected to the first RFIC, the first RFIC is disposed on a first FPC of the screen, and the first FPC is connected to the mainboard through a first BTB connector.

13 Claims, 6 Drawing Sheets

(56) References Cited

U.S. PATENT DOCUMENTS

| | | | | |
|---|---|---|---|---|
| 2017/0033442 | A1* | 2/2017 | Choi | G06F 3/044 |
| 2017/0179567 | A1 | 6/2017 | Zou et al. | |

FOREIGN PATENT DOCUMENTS

| | | | |
|---|---|---|---|
| CN | 106104915 | A | 11/2016 |
| CN | 106252835 | A | 12/2016 |
| CN | 106941206 | A | 7/2017 |
| CN | 206452415 | U | 8/2017 |
| CN | 207704418 | U | 8/2018 |
| CN | 108735115 | A | 11/2018 |
| CN | 108881539 | A | 11/2018 |
| CN | 208045675 | U | 11/2018 |
| CN | 208141382 | U | 11/2018 |
| CN | 109728415 | A | 5/2019 |
| CN | 110444857 | A | 11/2019 |
| EP | 2620845 | A1 | 7/2013 |
| EP | 3114728 | A1 | 1/2017 |
| JP | 2013-5312 | A | 1/2013 |

OTHER PUBLICATIONS

English Translation of CN108735115A (Year: 2018).*

International Search Report and Written Opinion of International Application No. PCT/CN2020/098852 mailed on Sep. 28, 2020.

First Office Action of Priority Application No. CN 201910716728.7 mailed on Jul. 20, 2020.

The Second Office Action of Priority Application No. CN 201910716728.7 mailed on Mar. 10, 2021.

* cited by examiner

TERMINAL DEVICE

CROSS-REFERENCE OF RELATED APPLICATIONS

The application is a Bypass Continuation-in-part Application of PCT/CN2020/098852 filed on Jun. 29, 2020, which claims priority to Chinese Patent Application No. 201910716728.7 filed on Aug. 5, 2019, which are incorporated herein by reference in their entirety.

TECHNICAL FIELD

Embodiments of the present disclosure relate to the field of terminal technologies, and in particular, to a terminal device.

BACKGROUND

The development of radio communications technologies is bringing more and more abundant application scenarios for radio communications systems, and imposing higher requirements on antennas, which are one of the crucial components of the radio communications systems. On the one hand, in some application scenarios, antennas need to be conformal, concealed, and safe in order to be integrated into wireless products such as vehicles, smart wearables, and smart homes. On the other hand, the increasingly higher transmission rate and greater communication capacity of the radio communications systems require higher carrier frequencies, which in return causes more and more path loss. As a result, an array antenna is required for improving the gain and overcoming the impact caused by the path loss. In order to achieve both high gain and beam sweeping or beamforming, the phased array antenna technology needs to be used, thereby requiring integrating more and more antennas in a limited space.

SUMMARY

An embodiment of the present disclosure provides a terminal device, including a screen and a mainboard, where an edge of the screen has a clearance area. The terminal device further includes a first radio frequency integrated circuit (RFIC) and at least one antenna element. At least a portion of the antenna element is disposed within the clearance area, and the antenna element is connected to the first RFIC. The first RFIC is disposed on a first flexible printed circuit (FPC) of the screen, a screen integrated circuit (IC) and a touch IC are further disposed on the first FPC, and the first FPC is connected to the mainboard through a first board to board (BTB) connector.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art can still derive other drawings from these accompanying drawings.

DETAILED DESCRIPTION OF EMBODIMENTS

The technical solutions in embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the embodiments of the present disclosure, a terminal device may be a mobile phone, a tablet computer, a notebook computer, an ultra-mobile personal computer (UMPC), a netbook, a personal digital assistant (PDA), or the like. A specific type of the terminal device is not limited in the embodiments of the present disclosure.

Figure 1:
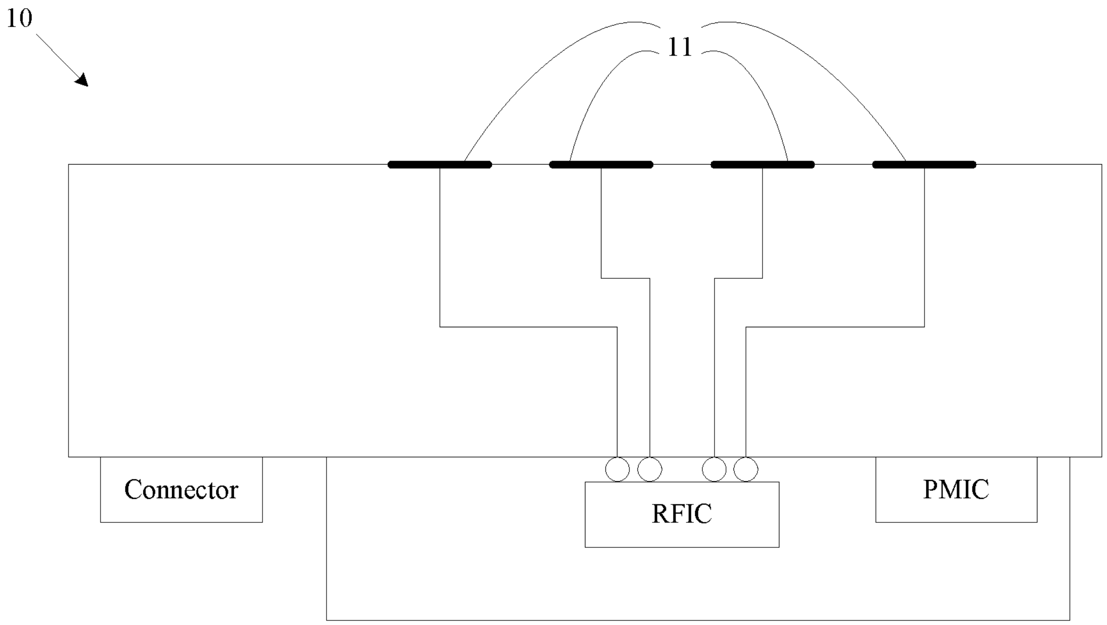
FIG. 1 is a schematic structural diagram of an AIP module in the related art.

Referring to FIG. 1, the current mainstream design solutions for millimeter-wave antennas primarily use the antenna in package (AIP) technology and process. That is, a millimeter-wave array antenna 11, a radio frequency integrated circuit (RFIC), and a power management integrated circuit (PMIC) are integrated into one antenna in package module 10. In practical applications, the module is disposed in a terminal device and thus occupies a space of an existing antenna, resulting in degradation of antenna performance of the terminal device.

Figure 2A:
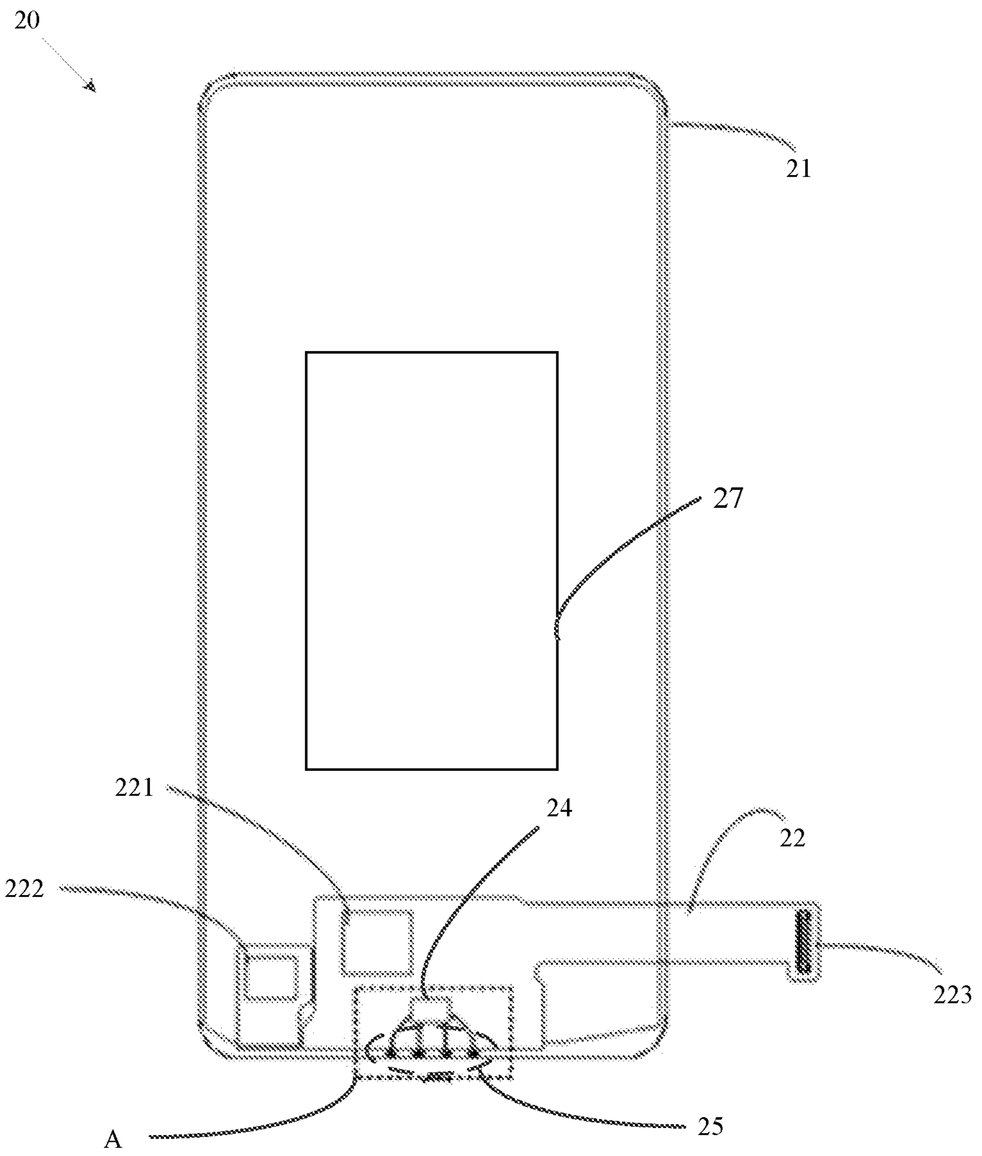
FIG. 2A is a first schematic structural diagram of a terminal device according to an embodiment of the present disclosure.

Referring to FIG. 2A, an embodiment of the present disclosure provides a terminal device 20, including a screen 21 and a mainboard 27, and an edge of the screen 21 has a clearance area 231. The terminal device 20 further includes a first RFIC 24 and at least one antenna element 25. At least a portion of the antenna element 25 is disposed within the clearance area 231, and the antenna element 25 is connected to the first RFIC 24.

The antenna element 25 may be a millimeter-wave antenna element. The following description uses an example in which the antenna element 25 is a millimeter-wave antenna element.

Still referring to FIG. 2A, the first RFIC 24 is disposed on a first flexible printed circuit (FPC) 22 of the screen 21, and the first FPC 22 is used to carry a screen integrated circuit (IC) 221 and a touch IC 222. The first FPC 22 is connected to the mainboard 27 through a first board to board (BTB) connector 223.

Figure 2B:
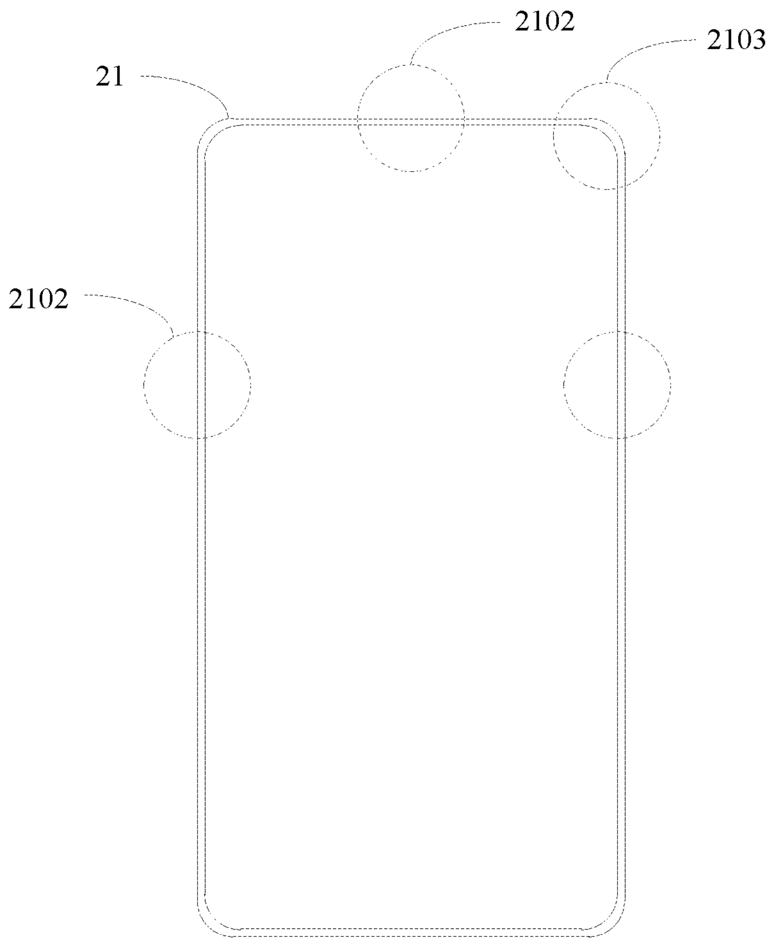
FIG. 2B is a first schematic diagram of positions of a clearance area in a screen according to an embodiment of the present disclosure.

FIG. 2A shows a scenario in which the clearance area 231 is located at a bottom area of the screen 21. It may be understood that a first end may alternatively be located at another position of the screen. As shown in FIG. 2B, the clearance area 231 may be located at a top area 2101 of the screen 21, a side area 2102 of the screen 21, or a corner area 2103 of the screen 21. A position of the clearance area 231 is not specifically limited in this embodiment of the present disclosure.

The first FPC 22 is an existing FPC in the terminal device 20, and the first FPC 22 is configured to transmit signals between the screen 21 and the mainboard 27.

FIG. 2A only shows an application scenario in which there are four millimeter-wave antenna elements 25. The millimeter-wave antenna elements 25 may alternatively be in another number, and those skilled in the art can adjust the number of millimeter-wave antenna elements 25 according to actual product requirements.

In this embodiment of the present disclosure, the first RFIC 24 is disposed on the first FPC 22, the first RFIC 24 is connected to the mainboard 27 through the existing first FPC 22 and the first BTB connector 223 of the terminal device 20, and the millimeter-wave antenna element 25 is connected to the first RFIC 24.

In this embodiment of the present disclosure, at least a portion of a millimeter-wave antenna element is disposed within a clearance area of a screen of a terminal device, and an RFIC connected to the millimeter-wave antenna element is disposed on an FPC in the related art of the terminal device, to share the FPC in the related art of the terminal device and a BTB connector, so that signal transmission between the millimeter-wave antenna element and the mainboard is implemented, and a space required by the millimeter-wave antenna element is reduced, thereby avoiding occupation of a space of an existing antenna, and improving antenna performance of the terminal device.

Figure 2C:
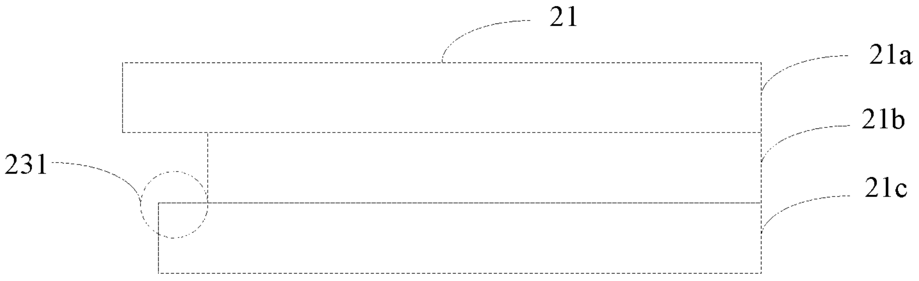
FIG. 2C is a second schematic diagram of a position of a clearance area in a screen according to an embodiment of the present disclosure.

The clearance area 231 is a reserved area on a glass substrate of the screen 21. Referring to FIG. 2C, the screen 21 includes a cover 21*a*, a touch layer 21*b*, and a glass substrate 21*c*. During processing of the screen 21, an area of the glass substrate 21*c* is slightly larger than that of the touch layer 21*b*, and thus a clearance area 231 is formed on an edge of the glass substrate 21*c*. The cover 21*a* may be a glass cover or a plastic cover.

There is no metal component in the clearance area 231, and there is only a glass or plastic medium. The area without metal components is selected, and at least a portion of a millimeter-wave antenna element 25 is disposed, so that an impact on communication of the millimeter-wave antenna can be avoided.

Figure 3:
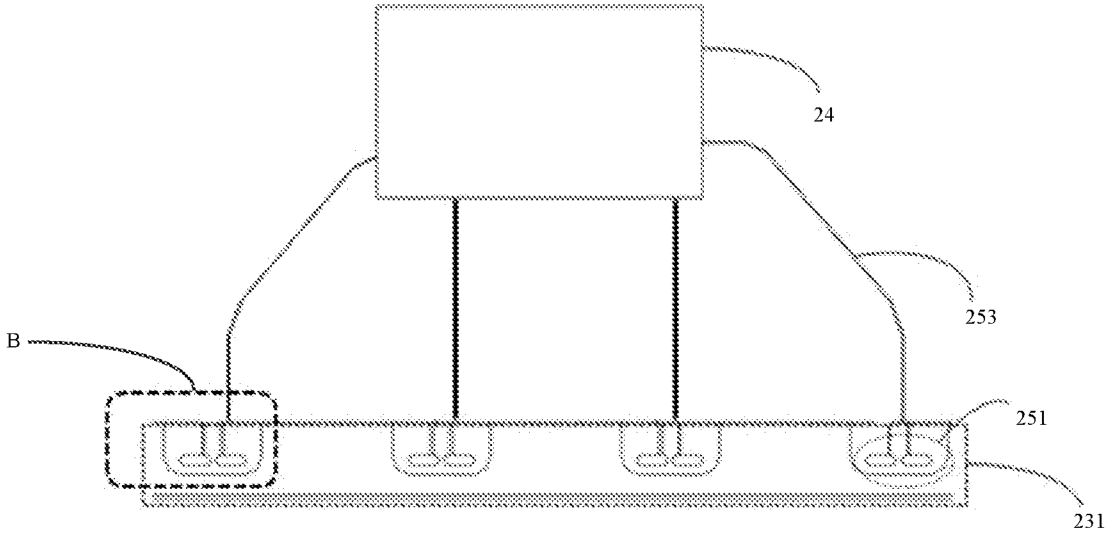
FIG. 3 is an enlarged schematic diagram of area A in FIG. 2A.
Figure 4:
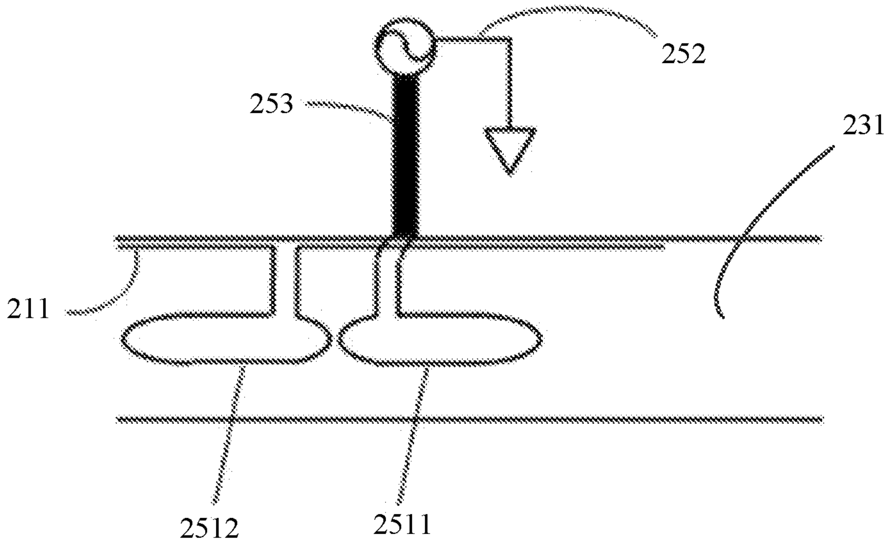
FIG. 4 is an enlarged schematic diagram of area B in FIG. 3.

Referring to FIG. 3 and FIG. 4, FIG. 3 is an enlarged schematic diagram of area A in FIG. 2A, and FIG. 4 is an enlarged schematic diagram of area B in FIG. 3.

The millimeter-wave antenna element 25 includes a millimeter-wave antenna 251, a millimeter-wave signal source 252, and a feeding structure 253.

The millimeter-wave antenna 251 is disposed within the clearance area 231. A millimeter-wave antenna is configured to transmit and receive millimeter waves. Due to short wavelength of millimeter waves, the size of the millimeter-wave antenna may be made small. However, a width of a clearance area of a screen in a current mainstream full-screen terminal device is usually about 1 mm, and thus the millimeter-wave antenna 251 may be disposed within the clearance area 231, specifically on a glass substrate in the clearance area 231.

It should be noted that the size of the millimeter-wave antenna can be reduced because a dielectric constant of a glass material is relatively high.

The millimeter-wave signal source 252 is disposed in the first RFIC 24, and the first RFIC 24 controls the millimeter-wave signal source 252, and then controls the millimeter-wave antenna 251 to transmit millimeter-wave signals.

The millimeter-wave antenna 251 is connected to the millimeter-wave signal source 252 through the feeding structure 253.

It can be understood that, in order to clearly show a structural composition of the millimeter-wave antenna element 25, all components of the millimeter-wave antenna element 25 are shown in FIG. 4. In an actual product, the millimeter-wave signal source 252 is disposed in the first RFIC 24, rather than in the area B in FIG. 3.

Optionally, the feeding structure 253 is disposed on the first FPC 22. The feeding structure 253 is a transmission line designed on the first FPC 22, and the millimeter-wave antenna 251 is connected to the millimeter-wave signal source 252 through the transmission line on the first FPC 22.

Still referring to FIG. 4, the millimeter-wave antenna 251 includes a first radiator 2511 and a second radiator 2512. The first radiator 2511 is connected to the millimeter-wave signal source 252 through a feeding structure 253, and the second radiator 2512 is grounded.

Optionally, the millimeter-wave antenna 251 is a dipole antenna, that is, the first radiator 2511 and the second radiator 2512 are symmetrically disposed.

It should be noted that FIG. 4 shows a scenario in which shapes of the first radiator 2511 and the second radiator 2512 are elliptical. The first radiator 2511 and the second radiator 2512 may alternatively be in another shape. Those skilled in the art may adjust the shapes of the first radiator 2511 and the second radiator 2512 according to actual product requirements.

Still referring to FIG. 4, the second radiator 2512 is formed by extending part of a ground wire 211 in an indium tin oxide (ITO) circuit of the screen into the clearance area 231.

The ITO circuit means an ITO circuit of a touch layer in the screen, and the ground wire 211 protects the ITO circuit used for static electricity of the touch screen. In this way, the part of the ground wire 211 in the ITO circuit serves as the second radiator 2512, and there is no need to provide a feeder ground wire, reducing the number of feeders of the millimeter-wave antenna 251. In addition, the ITO material has light transmittance, and the second radiator 2512 also has light transmittance, so that normal display of the screen is not affected.

Figure 5:
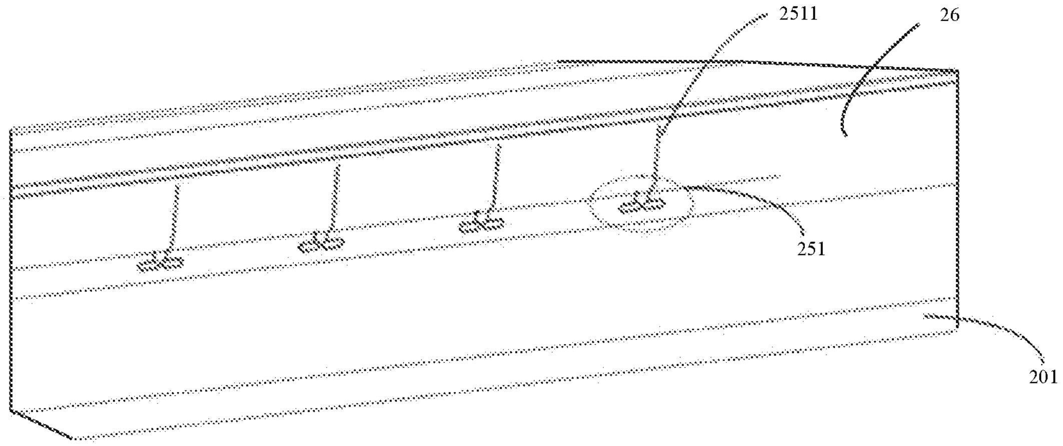
FIG. 5 is a schematic structural diagram of a millimeter-wave antenna and a signal reflection area according to an embodiment of the disclosure.

Optionally, referring to FIG. 5, the first radiator 2511 extends to a link area 26 between the screen and an FPC, and is connected to a feeding structure.

The link area 26 may also be referred to as a bonding area where the screen and the FPC are connected. For example, when the screen and the FPC are connected by a hot-pressing process, the bonding area is a hot-pressing position.

The first radiator 2511 and an ITO ground wire of the screen are designed on different layers via the bonding area, that is, the first radiator 2511 and the ground wire are not conductive.

Optionally, the first radiator 2511 is an ITO radiator, and the first radiator 2511 is made by an ITO wiring process, so that the first radiator 2511 has light transmittance, thus avoiding a case in which normal display of the screen is affected.

Still referring to FIG. 5, a housing of the terminal device includes a signal reflection area 201. After a signal sent by the millimeter-wave antenna 251 is reflected through the signal reflection area 201, a direction of the signal is the same as an orientation of the screen.

The signal reflection area 201 may be implemented by disposing a part of a metal area in the housing of the terminal device. A reflection effect of a metal surface on the signal is used to make a maximum radiation direction of the millimeter-wave antenna 251 to be the same as the orientation of the screen, thereby increasing antenna gain and improving wireless communication performance.

Optionally, the housing of the terminal device includes a front shell or a middle frame. The signal reflection area 201 is located in the front shell or the middle frame, and serves as a reflector of the millimeter-wave antenna 251 through the front shell or the middle frame.

Optionally, there is a space between the signal reflection area 201 and the millimeter-wave antenna 251 to avoid short circuiting of the antenna.

Figure 6:
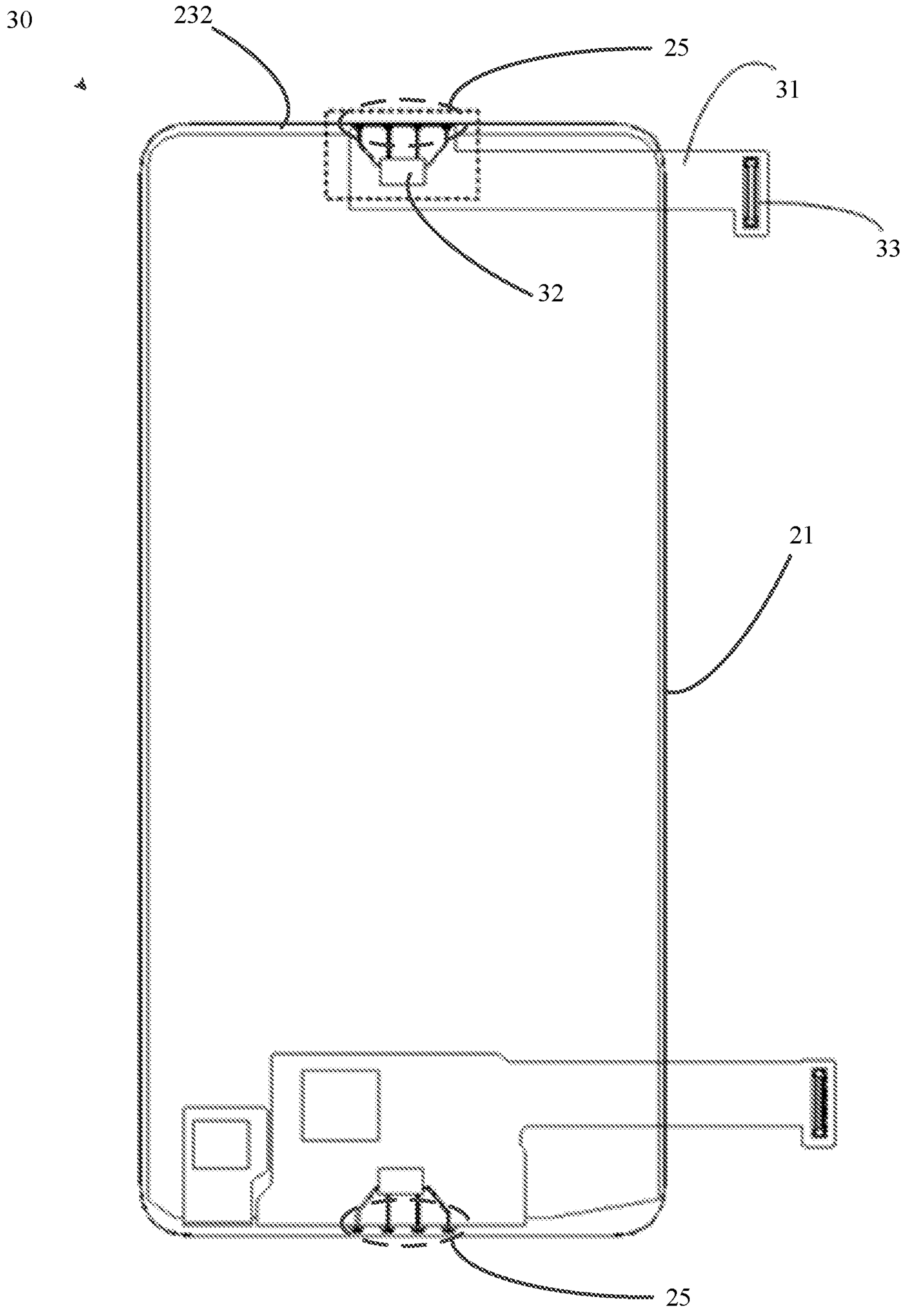
FIG. 6 is a second schematic structural diagram of a terminal device according to an embodiment of the present disclosure.

Referring to FIG. 6, an embodiment of the present disclosure provides another terminal device 30. A difference between the terminal device 30 and the terminal device 20 in FIG. 2A lies in that: The terminal device 30 further includes a second FPC 31 and a second RFIC 32. The first FPC 22 is disposed at a first end in a length direction of the screen 21, and the first FPC 22 carries the screen IC 221 and the touch IC 222. The second FPC 31 is disposed at a second end in the length direction of the screen 21, the second RFIC 32 is disposed on the second FPC 31, and the second FPC 31 is connected to the mainboard through a second BTB connector 33. There is a clearance area 232 at the second end, and a millimeter-wave antenna element 25 is disposed at both the first end and the second end. The millimeter-wave antenna element 25 located at the first end is connected to the first RFIC, and the millimeter-wave antenna element 25 located at the second end is connected to the second RFIC 32.

In this embodiment of the present disclosure, a millimeter-wave antenna element 25 is also disposed at the second end of the screen 21, and a second FPC 31, a second RFIC 32, and a second BTB connector 33 are added correspondingly. For a connection manner between components and structures of the components, reference may be made to the description of the corresponding components of the terminal device 20 in FIG. 2A. Details are not described herein.

In this way, when the terminal device 30 is used, if the millimeter-wave antenna at the first end is blocked, the terminal device 30 may automatically switch to use the millimeter-wave antenna at the second end to improve a spatial coverage of the millimeter-wave antenna, such as increase a cumulative distribution function indicator.

The automatic switching of the millimeter-wave antenna may be implemented by an antenna switching method in the related art, which is not specifically limited in this embodiment of the present disclosure.

In this embodiment of the present disclosure, a millimeter-wave antenna element is disposed at both a first end and a second end. At least a portion of the millimeter-wave antenna element is disposed within a clearance area of a screen of a terminal device, and an RFIC connected to the millimeter-wave antenna element is disposed on an FPC of the terminal device, to share the FPC of the terminal device and a BTB connector, so that signal transmission between the millimeter-wave antenna element and the mainboard is implemented, and a space required by the millimeter-wave antenna element is reduced, thereby avoiding occupation of a space of an existing antenna, and improving antenna performance of the terminal device.

Optionally, when operation of the millimeter-wave antenna at one of the ends is affected, the millimeter-wave antenna at the other end may be used through automatic switching, which improves a spatial coverage of the millimeter-wave antenna and enhances antenna performance of the terminal device.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A terminal device, comprising a screen and a mainboard, wherein an edge of the screen has a clearance area, and the terminal device further comprises a first radio frequency integrated circuit (RFIC) and at least one antenna element; wherein at least a portion of the antenna element is disposed within the clearance area;

the antenna element is connected to the first RFIC; and the first RFIC is disposed on a first flexible printed circuit (FPC) of the screen, a screen integrated circuit (IC) and a touch IC are further disposed on the first FPC, and the first FPC is connected to the mainboard through a first board to board (BTB) connector; wherein the antenna element is a millimeter-wave antenna element; and the terminal device further comprises a second FPC and a second RFIC, the first FPC is disposed at a first end in a length direction of the screen, and the second FPC is disposed at a second end in the length direction of the screen; the second RFIC is disposed on the second FPC, and the second FPC is connected to the mainboard through a second BTB connector; and millimeter-wave antenna element is disposed at both the first end and the second end, a millimeter-wave antenna element located at the first end is connected to the first RFIC, and a millimeter-wave antenna element located at the second end is connected to the second RFIC.

2. The terminal device according to claim 1, wherein the clearance area is a reserved area of the screen;

the millimeter-wave antenna element comprises a millimeter-wave antenna and a feeding structure;

a millimeter-wave signal source is disposed in the first RFIC;

the millimeter-wave antenna is disposed within the clearance area; and the millimeter-wave antenna is connected to the millimeter-wave signal source through the feeding structure.

3. The terminal device according to claim 2, wherein the feeding structure is disposed on the first FPC.

4. The terminal device according to claim 3, wherein the millimeter-wave antenna comprises a first radiator and a second radiator, the first radiator is connected to the millimeter-wave signal source through the feeding structure, and the second radiator is grounded.

5. The terminal device according to claim 4, wherein the first radiator and the second radiator are symmetrically disposed.

6. The terminal device according to claim 4, wherein the first radiator is an indium tin oxide (ITO) radiator.

7. The terminal device according to claim 4, wherein the second radiator is formed by extending part of a ground wire in an indium tin oxide (ITO) circuit of the screen into the clearance area.

8. The terminal device according to claim 4, wherein the first radiator extends to a link area between the screen and an FPC, and the first radiator is connected to the feeding structure.

9. The terminal device according to claim 2, wherein a housing of the terminal device comprises a signal reflection area, and after a signal sent by the millimeter-wave antenna is reflected through the signal reflection area, a direction of a reflected signal is a same as an orientation of the screen.

10. The terminal device according to claim 9, wherein the housing comprises a front shell or a middle frame, and the signal reflection area is located in the front shell or the middle frame.

11. The terminal device according to claim 9, wherein there is a space between the signal reflection area and the millimeter-wave antenna.

12. The terminal device according to claim 1, wherein the clearance area is located at a top area of the screen, a side area of the screen, or a corner area of the screen.

13. The terminal device according to claim 1, wherein there is a clearance area at the second end.

* * * * *